United States Patent
Lehtinen et al.

(10) Patent No.: US 6,449,264 B1
(45) Date of Patent: Sep. 10, 2002

(54) RADIO TRANSCEIVER WITH TWO FREQUENCY BANDS

(75) Inventors: Kari Lehtinen, Salo; Seppo Hietala; Jussi Numminen, both of Turku, all of (FI)

(73) Assignee: Nokia Mobile Phones Limited, Espoo (FI)

( * ) Notice: Subject to any disclaimer, the term of this patent is extended or adjusted under 35 U.S.C. 154(b) by 0 days.

(21) Appl. No.: 09/190,336

(22) Filed: Nov. 12, 1998

(30) Foreign Application Priority Data

Nov. 18, 1997 (FI) .................................. 974269

(51) Int. Cl.[7] .............................................. H04Q 7/00
(52) U.S. Cl. ...................................... 370/328; 370/343
(58) Field of Search ................................ 370/276, 280, 370/294, 343, 281, 295, 328; 455/73, 75, 76

(56) References Cited

U.S. PATENT DOCUMENTS

| 5,657,344 A | * | 8/1997 | Na ............................. 375/219 |
| 5,896,562 A | * | 4/1999 | Heinonen .................... 455/76 |
| 6,226,276 B1 | * | 5/2001 | Na ............................. 370/294 |
| 6,269,253 B1 | * | 7/2001 | Maegawa et al. .......... 455/552 |

FOREIGN PATENT DOCUMENTS

| EP | 0 653 851 A3 | 5/1995 |
| EP | 0 655 844 A3 | 5/1995 |
| EP | 0 678 974 A3 | 10/1995 |

OTHER PUBLICATIONS

Finnish Patent Application No. FI 941862 with English translation thereof.

* cited by examiner

*Primary Examiner*—Ajit Patel
(74) *Attorney, Agent, or Firm*—Perman & Green, LLP (57) ABSTRACT

A radio transceiver (400, 450) is intended for transmission and reception of radio signals in two frequency bands, and it comprises a first signal input (101) for receiving radio signals in the first frequency band, and a second signal input (102) for receiving radio signals in the second frequency band. In addition, it comprises

- a first mixer connected to the first signal input (101) for mixing the radio signals (DCS RX) in the first frequency band onto a predetermined first intermediate frequency (IF1);
- a second mixer (404) for mixing the first intermediate frequency (IF1) onto a predetermined second intermediate frequency (IF2); and
- a third mixer (402, 461) connected to the second signal input (102) for mixing the radio signals (GSM RX) in the second frequency band onto a predetermined frequency (IF2), which is substantially the same as the second intermediate frequency.

21 Claims, 8 Drawing Sheets

RADIO TRANSCEIVER WITH TWO FREQUENCY BANDS

TECHNOLOGICAL FIELD

The present invention relates generally to the structure of a radio transceiver. Particularly, the invention relates to the structure of a high frequency part and intermediate frequency part of a radio transceiver, and to the selection of frequencies according to which it is possible to realize a device working in two frequency bands in an economical way.

BACKGROUND OF THE INVENTION

In addition to the present cellular radio systems, new systems are being built in which the frequency band usually differs from that used in the old system and which, at least partly, operate in the same region with the old systems. Further, cellular radio systems operating in different frequency bands are already used in various parts of the world. From the user's point of view, it would be advantageous if one single terminal (such as a mobile phone) could operate in several systems of different frequency bands in accordance with the user's selection or a command given by the network. Important combinations of two systems and frequency bands are GSM and DCS1800 (Global System for Mobile telecommunications; Digital Communications System at 1800 megahertz). One form of DCS1800 is also called PCN (Personal Communications Network); in the present patent application, DCS1800 is called DCS for short. The transmission frequency band for a GSM terminal is 890–915 MHz, and the reception frequency band 935–960 MHz. The respective transmission frequency band for DCS is 1710–1785 MHz, and the reception frequency band is 1805–1880 Mz. For GSM, the band width or the extent of the transmission and reception frequency bands is 25 MHz, and 75 MHz for DCS; the duplex interval is respectively 45 MHz for GSM and 95 MHz for DCS. The simplest way to implement a radio transceiver with two frequency bands is to redouble all radio and intermediate frequency parts between the antenna and the baseband interface. However, this solution is relatively expensive and space consuming. A natural direction to find a more economical solution is to try to use as many common intermediate frequency parts as possible in both systems.

Figure 1:
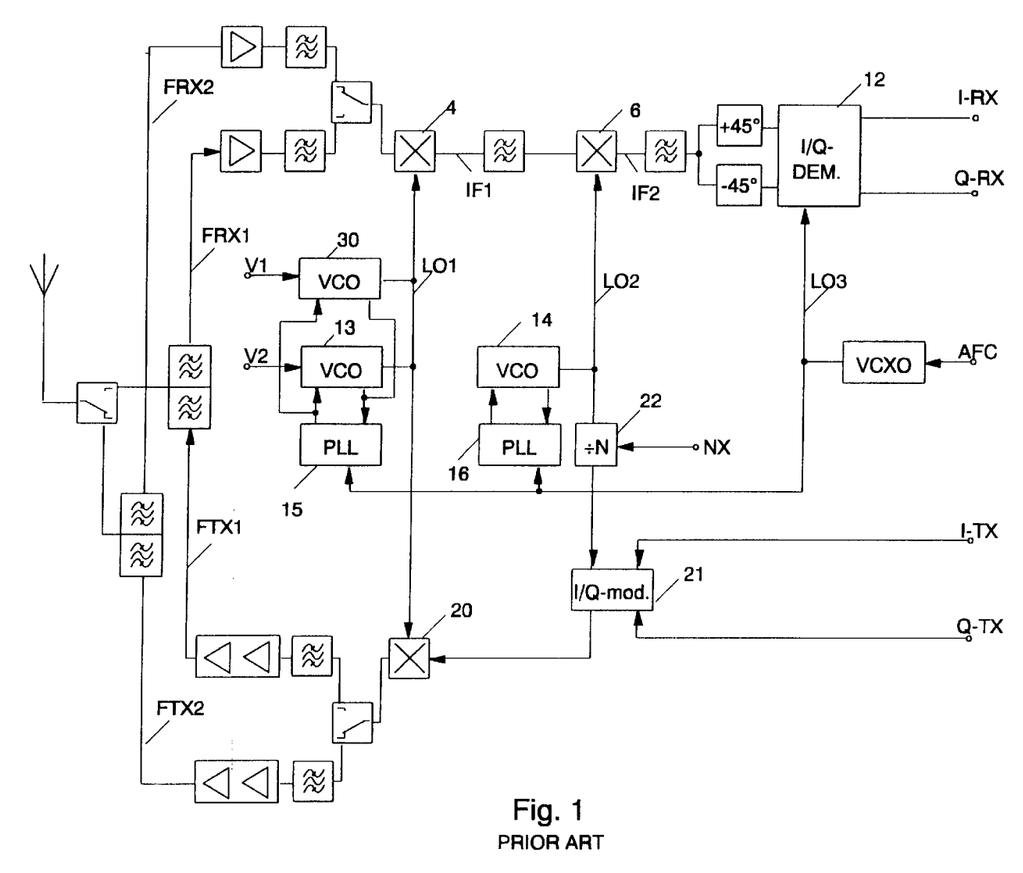
FIG. 1 presents a prior art radio transceiver.

The Finnish patent application No. 941862 (Nokia Mobile Phones Ltd.) and the corresponding EP patent application published with the number EP-0 678 974, disclose a radio transceiver according to FIG. 1 operating in two frequency bands. Here the reception frequency signal FRX1 or FRX2 is first mixed to a first intermediate frequency IF1 in a mixer 4 by using the first mixing frequency LO1, and then to a second intermediate frequency IF2 in a mixer 6 by using a second mixing frequency LO2. Additionally, a third mixing frequency LO3 is used in demodulator 12 to demodulate the signal. The first and second intermediate frequencies remain unchanged irrespective of the frequency band one operates in. A different first mixing frequency is generated in accordance with the frequency band the radio transceiver operates in. For the generation of different first mixing frequencies, the apparatus has two separate UHF (Ultra High Frequency) frequency synthesizers 13 and 30. The abbreviation VCO in the figure stands for Voltage Controlled Oscillator. A common phase locked loop (PLL) 15 is used for adjusting the VCO frequencies. From the first intermediate frequency mixer 4 onwards, the same parts may be used in the receiver and, for example, it is not necessary to alter the second mixing frequency LO2 when transferring from one frequency band to another. A common modulator 21 is used for transmitting the signal, for which the necessary modulation frequency is obtained by dividing the second mixing frequency LO2 by an integer N in divider 33; further, a mixer 20 is used to which the said first mixing frequency LO1 is led as the mixing frequency. The radio frequency of a signal FTX1 or FTX2 to be transmitted is determined by which of the VCOs 13, 30 is used to generate the mixing frequency. Because of the two UHF-VCOs 13 and 30, this kind of apparatus requires relatively much current, its structure is large, it causes problems for the layout design, and it is expensive to manufacture.

Figure 2:
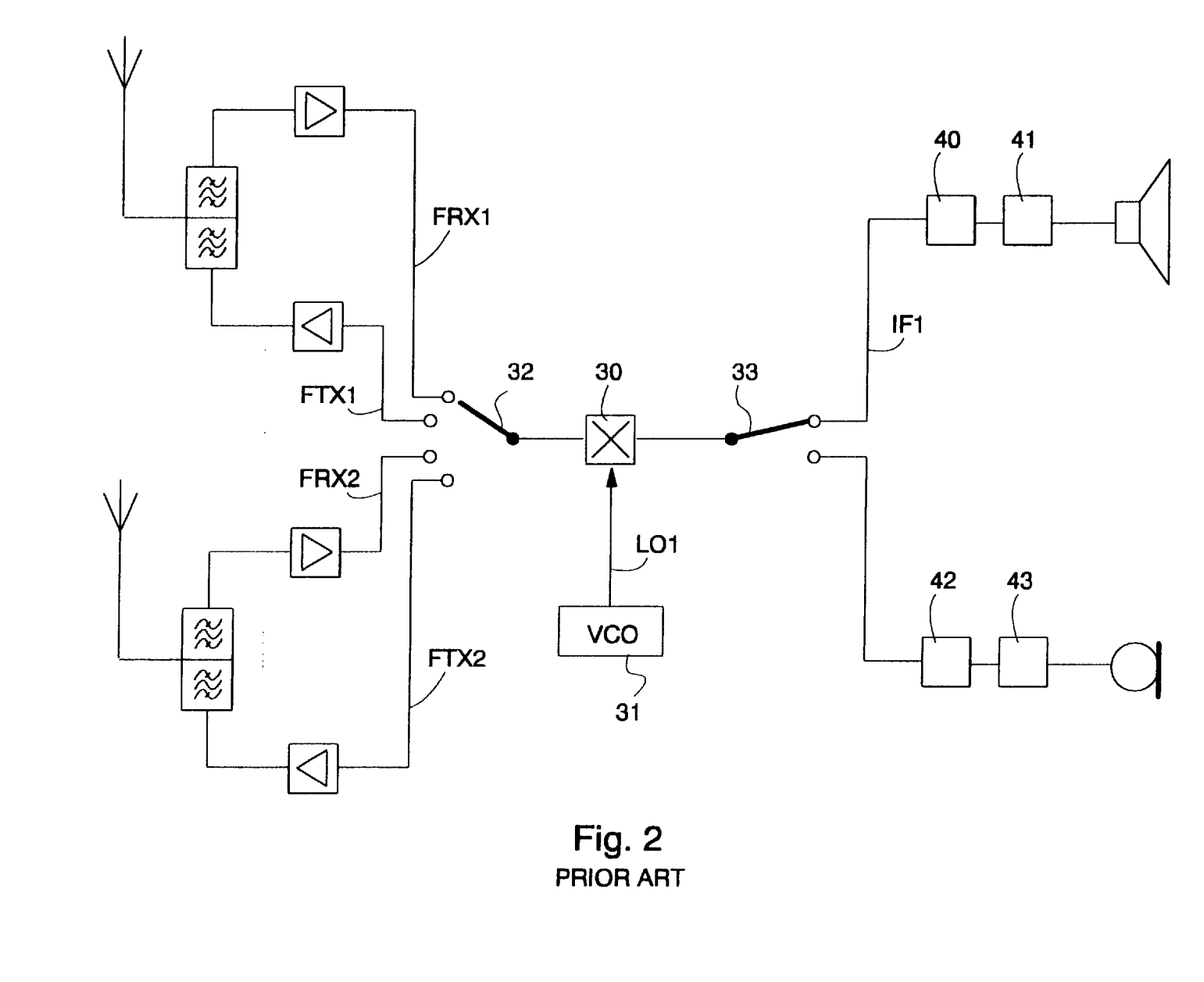
FIG. 2 shows another prior art radio transceiver.

The European published application No. EP 0 653 851 discloses a radio transceiver with two frequency bands in accordance with FIG. 2, containing only one UHF frequency synthesizer 31. The first mixing frequency LO1 generated by it is selected so that it is situated half-way between the two frequency bands in which the apparatus is supposed to operate. The publication presents an example in which the upper frequency band is 1710–1900 MHz, and the lower band is 890–960 MHz so that the first mixing frequency LO1 varies between 1290 and 1500 MHz, and the first intermediate frequency IF1 is 400 MHz. Consequently, when mixing onto the first intermediate frequency, lower LO injection is used for the first (higher) frequency band, and upper LO injection is used for the second (lower) frequency band. However, the problems related to this solution include the relatively wide tuning range required for the frequency synthesizer (at least 15% of the medium frequency of the frequency synthesizer) and the frequency hop which comes into question in such Time Division Duplexing (TDD) where different frequencies are used for reception and transmission. A specific feature of FIG. 2 is the use of the same mixer 30 both in transmission and reception. Switches 32 and 33 are used for separating reception and transmission from each other, and the switch 32 is additionally used for selecting the frequency band. Block 40 comprises intermediate frequency parts including e.g. the second intermediate mixer, and block 41 comprises the usual demodulation, decoding and D/A conversion parts. Block 43 comprises the A/D conversion needed for the transmission, and coding, and block 42 comprises the modulation needed for the transmission.

SUMMARY OF THE INVENTION

The object of the present invention is to introduce a new structure for a radio transceiver with two frequency bands, which is small and economical to manufacture, and which is suitable for use in a case when time division multiplexing is used in at least one of the two frequency bands.

These objects are achieved by selecting the mixing and intermediate frequencies so that the first mixing frequency of the receiver may, in a radio system of the first frequency band, be derived from the corresponding frequency of the second frequency by simple calculation process.

The radio transceiver of the invention is intended to be used for the reception and transmission of radio signals in two frequency bands, and it comprises a first signal input for the reception of radio signals in the first frequency band, and a second signal input for the reception of radio signals in the second frequency band. The invention is characterized in that it comprises a first mixer connected to the first signal input for mixing the radio signals of the first frequency band onto a predetermined first intermediate frequency;

a second mixer for mixing said first intermediate frequency onto a predetermined second intermediate frequency; and a third mixer connected to the second signal input for mixing the radio signals of the second frequency band onto a predetermined frequency which is substantially the same as said second intermediate frequency.

In a radio transceiver apparatus of the present invention, there is provided one UHF frequency synthesizer for generating the first mixing frequency, the frequency of the synthesizer being adjustable in a known way within a certain tuning range. The limiting values for the tuning range are selected so that, by adjusting the first mixing frequency, the receiver may be tuned in a known way to all frequencies in use in a first radio system. A block carrying out a certain simple operation, such as the division or multiplying of the frequency, may be connected in series with the UHF frequency synthesizer. The operation is selected so that, for tuning the receiver to frequencies used in a second radio system, when the oscillation produced by the UHF frequency synthesizer is led through said block, the series connection of the UHF frequency synthesizer and the block is capable of generating all the frequencies required by the second radio system without having to adjust the frequency of the UHF frequency synthesizer significantly outside said tuning range.

The received signal according to the radio system of higher frequency is still mixed a second time onto a certain lower frequency before the signal paths of the different systems are combined. When the radio transceiver is receiving a signal according to the radio system of higher frequency, it carries out three downconversions between reception and demodulation. A signal according to the radio system of lower frequency is only mixed down twice between reception and demodulation. The signal frequency of the radio system of higher frequency is after the second downconversion the same as the signal frequency of the radio system of lower frequency after the first downconversion.

BRIEF DESCRIPTION OF THE DRAWINGS

The invention is next described in more detail referring to the advantageous exemplary embodiments and the enclosed drawings, in which.

In connection with the previous description of prior art, reference has been made to FIGS. 1 and 2, so in the following description of the invention and its advantageous embodiments, reference is mostly made to FIGS. 3–7. Same reference numbers are used for indicating similar parts in the figures.

DETAILED DESCRIPTION OF THE INVENTION

Figure 3:
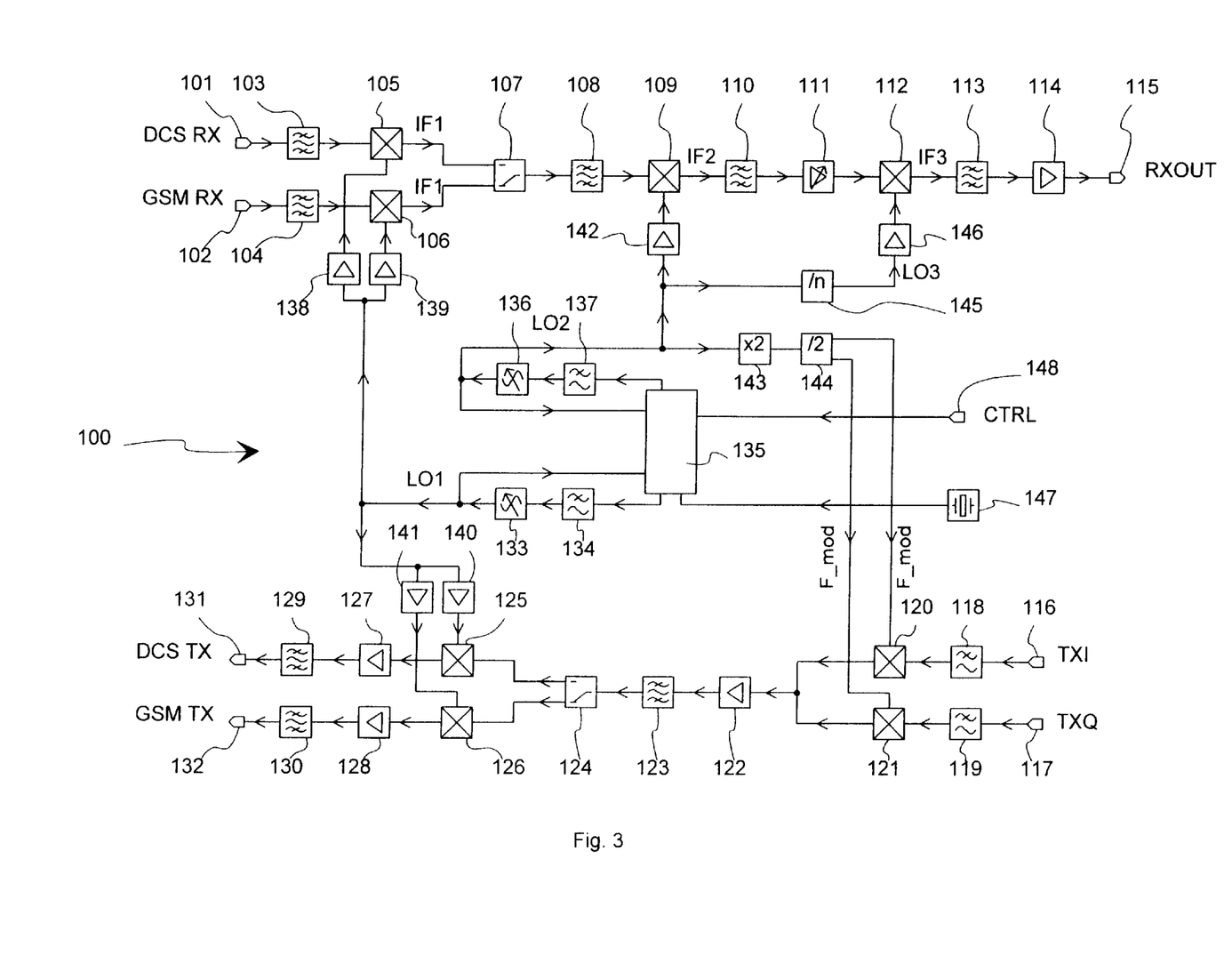
FIG. 3 shows a radio transceiver according to the present invention.

FIG. 3 presents a radio transceiver 100 developed in a research leading to the present invention. The received DCS signal is led to the circuit in the figure along line 101, and the received GSM signal along line 102. Both signals travel through their own bandpass filters 103, 104 to their own mixers 105, 106, in which they are mixed onto the first intermediate frequency IF1. Because the first intermediate frequency always is the same, irrespective of the frequency of the received signal, the signal paths may be joined in selection switch 107, from which the common signal path travels to mixer 109 via bandpass filter 108. In the mixer, the signal is mixed onto the second intermediate frequency IF2. Then there follows filtering 110 and the automatic gain control 111 before mixer 112, in which the signal is mixed onto the third intermediate frequency IF3. In the signal path there still are situated filter 113 and amplifier 114 before connection 115 leading to demodulator (not shown) and via that to a base frequency part (not shown).

A structure of a radio receiver based on three intermediate frequency mixings is in itself known, for example, from the European application publication No. EP 0 655 844, which discloses such a radio transceiver of the DCS system. However, the transceiver described in the publication works in the DCS system only, i.e. in one frequency band.

The transmitter chain of FIG. 3 receives the signal to be transmitted along the I and Q connections 116 and 117. The IQ modulator of the transmitter comprises low pass filters 118 and 119, and mixers 120 and 121, after which the I and Q signals are joined and led to the selection switch 124 via amplifier 122 and bandpass filter 123. The position of the switch 124 determines whether the signal is transmitted on the GSM or DCS frequency; the alternative signal paths corresponding to the different systems comprise mixers 125 and 126, and buffer amplifiers 127 and 128. The signal to be transmitted is led via the bandpass filters 129 and 130 to transmission power amplifiers (not shown) and further to an antenna (not shown) via connections 131 and 132.

The first mixing frequency LO1 is generated in the UHF frequency synthesizer 133, which is called UHF-VCO (Ultra High Frequency Voltage Controlled Oscillator) for short. It receives its control signal from control logic 135 via low pass filter 134. Correspondingly, the VHF frequency synthesizer 136 (VHF-VCO, Very High Frequency Voltage Controlled Oscillator) receives its control signal from control logic 135 via low pass filter 137. The first mixing frequency LO1 is led to the mixers 105 and 106 via amplifiers 138 and 139, and to the mixers 125 and 126 via amplifiers 140 and 141. The second mixing frequency LO2 is led to the mixer 109 via amplifier 142, and to the mixers 120 and 121 via frequency multiplier 143 and divider 144 as two different-phased versions. In addition, a third mixing frequency LO3 is generated from the second mixing frequency LO2 by frequency divider 145; this frequency is led to mixer 112 via amplifier 146. The control logic 135 receives the reference frequency from a crystal oscillator 147 and the control signal from connection 148.

In the structure of FIG. 3, the first mixing frequency LO1 has to be between the frequency bands of the different systems. In addition, the use of a common filter 108 on the first intermediate frequency and the precondition of keeping the UHF-VCO tuning range moderate, set approximate limits 400 MHz<IF1<490 MHz, for the first intermediate frequency IF1. Compatibility with known GSM demodulators further requires the third intermediate frequency IF3 to be 13 MHz. The divider 145 may realize for example a division by four so that a pair of equations may be written for the receiver chain frequencies $IF2-LO3=\pm 13$ MHz $IF1-4\times LO3=\pm IF2$ (1)

Certain upper and lower limits are obtained for the frequencies IF2 and LO3 by substituting in the equation pair in turn the limiting values IF1=400 MHz and IF1=490 MHz, and by handling each selection combination of the signs on the right side of the equations separately. In addition, the tuning range required from the UHF-VCO may be calculated by taking into consideration the frequency hop between reception and transmission conditions. In the architecture shown in FIG. 3, the frequency hop RX_TX is obtained by calculating the difference between the modulation frequency and the first intermediate frequency added or subtracted by the duplex interval, i.e. in GSM RX_TX=IF1−4×LO3+45 MHz and in DCS RX_TX=4×LO3−IF1+95 MHz Summary of the results is shown in the following table. The leftmost column shows the selection of signs in the right side of the equations (1) and the next column shows the selection of limit values IF1=400 MHz and IF1=490 MHz.

TABLE

| Signs | IF1 (MHz) | RX_TX (MHZ) GSM | DCS | Tuning range of UHF-VCO (MHz) | (%) |
|---|---|---|---|---|---|
| −13 MHz, −IF2 | 400 | −71 | −211 | 1194–1480 | 21 |
| | 490 | −101 | −241 | 1074–1551 | 36 |
| +13 MHz, −IF2 | 400 | −106 | −246 | 1159–1480 | 24 |
| | 490 | −136 | −276 | 1039–1586 | 41 |
| −13 MHz, +IF2 | 400 | 115 | −25 | 1220–1480 | 19 |
| | 490 | 133 | −7 | 1292–1450 | 12 |
| +13 MHz, +IF2 | 400 | 135 | −5 | 1200–1480 | 21 |
| | 490 | 153 | 13 | 1272–1450 | 13 |

The four uppermost lines in the table show that if a solution of the equation pair (1) is selected in which the sign of IF2 is negative, the tuning range required from the UHF-VCO becomes so large that it is difficult to realize with one component; in practice, two UHF-VCOs are needed. Also in other cases, the tuning range is more than 10% of the medium frequency of the UHF-VCO. Also the frequency hop in the frequency generated by the UHF-VCO between transmission and reception activity is detrimental, because it makes the change from transmission to reception slower, and vice versa. Especially in a so-called multislot system, in which several time intervals in the frame may be reserved for one apparatus, the inconvenience of the frequency hop is emphasized. It would be advantageous, if the frequency hop were not necessary when operating in accordance with at least one of the systems (here GSM or DCS). Other drawbacks of the structure in FIG. 3 include a relatively large frequency of the VHF-VCO (considering that the frequency in question still has to be redoubled in doubler 143), and certain interfering frequencies: in many cases a certain DCS transmission frequency acts as an image frequency on the GSM reception band, and a second harmonic frequency of a certain undesired received frequency f_spur may cause a disturbance signal on the first intermediate frequency in accordance with the formula 2×f_spur−LO1=IF1.

The absolute value of the difference between the image frequency and mixing frequency is as big as the absolute value of the difference between the desired frequency and mixing frequency so that the reception and mixing of the image frequency gives the same mixing result as the reception and mixing of the desired frequency. The closer the desired frequency and mixing frequency are to each other, the closer also are the desired frequency and image frequency, and the more sharp-edged filter is needed to filter out the image frequency. Filters that have a sharp-edged frequency response are relatively large and expensive so, for the objectives of the invention, it would be preferable to use an image frequency filter with as round edges as possible.

The consideration of interfering frequencies in connection with frequency selections for radio transceivers has been neglected in several prior art publications. Advantages caused by savings in size, price and power gained by using common components in systems of different frequency bands may be lost, if it is required to attenuate disturbance signals caused by simplifications in the apparatus, for example, by additional filtering in other parts of the radio transceiver, or if it is necessary to use special components merely to eliminate interferences.

Figure 4:
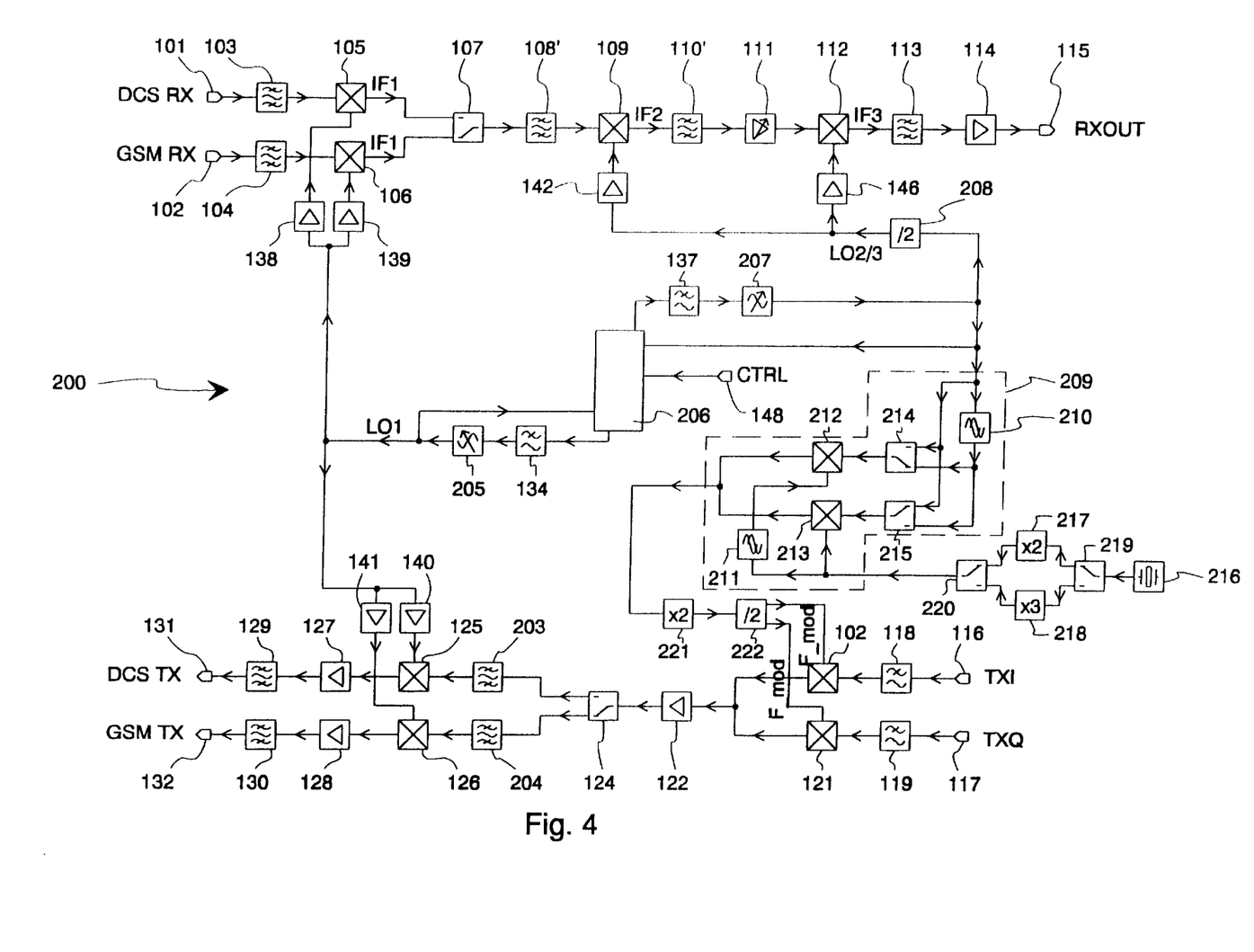
FIG. 4 shows another radio transceiver according to the present invention.

FIG. 4 shows a second radio transceiver structure 200 which differs from the structure of FIG. 3 in the selection and generating of mixing frequencies. Due to different mixing frequencies, also the first and second intermediate frequencies become different from those in FIG. 3 during reception. The first intermediate frequency IF1 is 443 MHz, the second intermediate frequency IF2 is 228 MHz, and the third intermediate frequency IF3 is 13 MHz. In the reception chain starting from connections 101 and 102 and ending to connection 115, the most considerable difference compared to FIG. 3 is the different frequency response of the intermediate frequency filters 108' and 110' of the bandpass type (corresponding to the filters 108 and 110 in FIG. 3). In a transmission chain starting from connections 116 and 117 and ending to connections 131 and 132, the bandpass filter 123 in FIG. 3 has been replaced by parallel filters 203 and 204 placed after the selection switch 124, because the frequency after the IQ modulator now is unequal in GSM and DCS. The UHF-VCO 205 is placed in the same way as in FIG. 3, but the frequencies generated by it are different. It is controlled by control logic 206 via low pass filter 134. Also the VHF-VCO 207 is placed in the same way in relation to the control logic as in FIG. 3, but it works on a different frequency. The frequency of 430 MHz generated by the VHF-VCO 207 is divided by two in divider 208, and the frequency of 215 MHz thus gained acts both as second and third mixing frequencies, i.e. it is led to mixer 109 via amplifier 142 and to mixer 112 via amplifier 146.

In the structure of FIG. 4, the frequencies required by the IQ modulator of the transmission chain are generated from the frequency of 430 MHz generated by the VHF-VCO 207, which is led to image rejection mixer 209 comprising two phase shifters 210 and 211 of 90 degrees, two mixers 212 and 213, and selection switches 214 and 215. The mixing frequency is derived from crystal oscillator 216 of 26 MHz either with a doubler 217 (in GSM) or a tripler 218 (in DCS). The selection is made by using selection switches 219 and 220 which work simultaneously with the other GSM-DCS selection switches being part of the structure. The frequency generated by block 209 is 482 MHz in GSM and 352 MHz in DCS, and interdephased versions are formed in doubler 221 and divider by two 222 which are then led to mixers 120 and 121 of the IQ modulator.

In FIG. 4, the tuning range of the UHF-VCO 205 is 1358–1437 MHz, i.e. 5.7% of the medium frequency, and the frequency hop between transmission and reception is small (6 MHz in GSM and 4 MHz in DCS). However, the structure still contains some drawbacks. When generating mixing frequencies, there is a need for components that are difficult to realize—for example, tripler 218—which again easily leads to undesired mixing results. On certain GSM channels, the image frequency generated in the GSM transmission hits the DCS reception band, and an undesired received frequency f_spur of 922.8 MHz causes interferences on the intermediate frequency in accordance with formula 2×fspur—LO1=IF1. Further, the frequency of VHF-VCO is relatively large, considering that it still has to be redoubled in a frequency doubler 221.

In the foregoing, attention has been paid to the fact that an undesired received frequency f_spur—in fact its second harmonic frequency 2×f_spur—may cause interferences on the first intermediate frequency. An edge condition may be set according to which the frequency f_spur, realizing the equation 2×f_spur—LO1=IF1, has to be lower than 915 MHz or higher than 980 MHz. The limits are determined so that the frequency response of the radio frequency filter (reference number 104 in the figures) of the GSM receiver already contains a considerable amount of attenuation outside the frequency band of 915 MHz–980 MHz. Taking into consideration the afore shown values of the mixing frequency LO1 the conditions $$\text{IF1} < 435 \text{ MHz or}$$
$$\text{IF1} > 512.5 \text{ MHz} \quad (2)$$

are obtained for the first intermediate frequency F1.

Of these, only the first-mentioned condition comes into question, because the latter would lead to an unpractically big value for IF1. Thus, the value 435 MHz may be considered to be the upper limit for IF1, and some kind of a lower limit is obtained at least from the clause, according to which IF1 has to be at least two times the width of the reception band of DCS, which is 75 MHz. In practice, the frequency response of the radio frequency filters sets the lower limit for IF1 to about 190–200 MHz. In addition, some conditions may be set considering the mixing frequency F_mod to be fed to the IQ modulator, and other mixing frequencies and the frequency hop between transmission and reception in the UHF-VCO. If the solution of FIG. 3 does not require that the device only contain one UHF-VCO, the conditions may be written:

$$\text{IF2}-\text{LO3}=\pm 13 \text{ MHz}$$
$$\text{IF1}-4\times\text{LO3}=\pm\text{IF2}$$
$$\text{F\_mod}=N\times\text{LO3}; \; N=2 \text{ or } N=4 \quad (3)$$
$$\text{F\_mod}=\text{IF1}+45 \text{ MHz}$$

Figure 5:
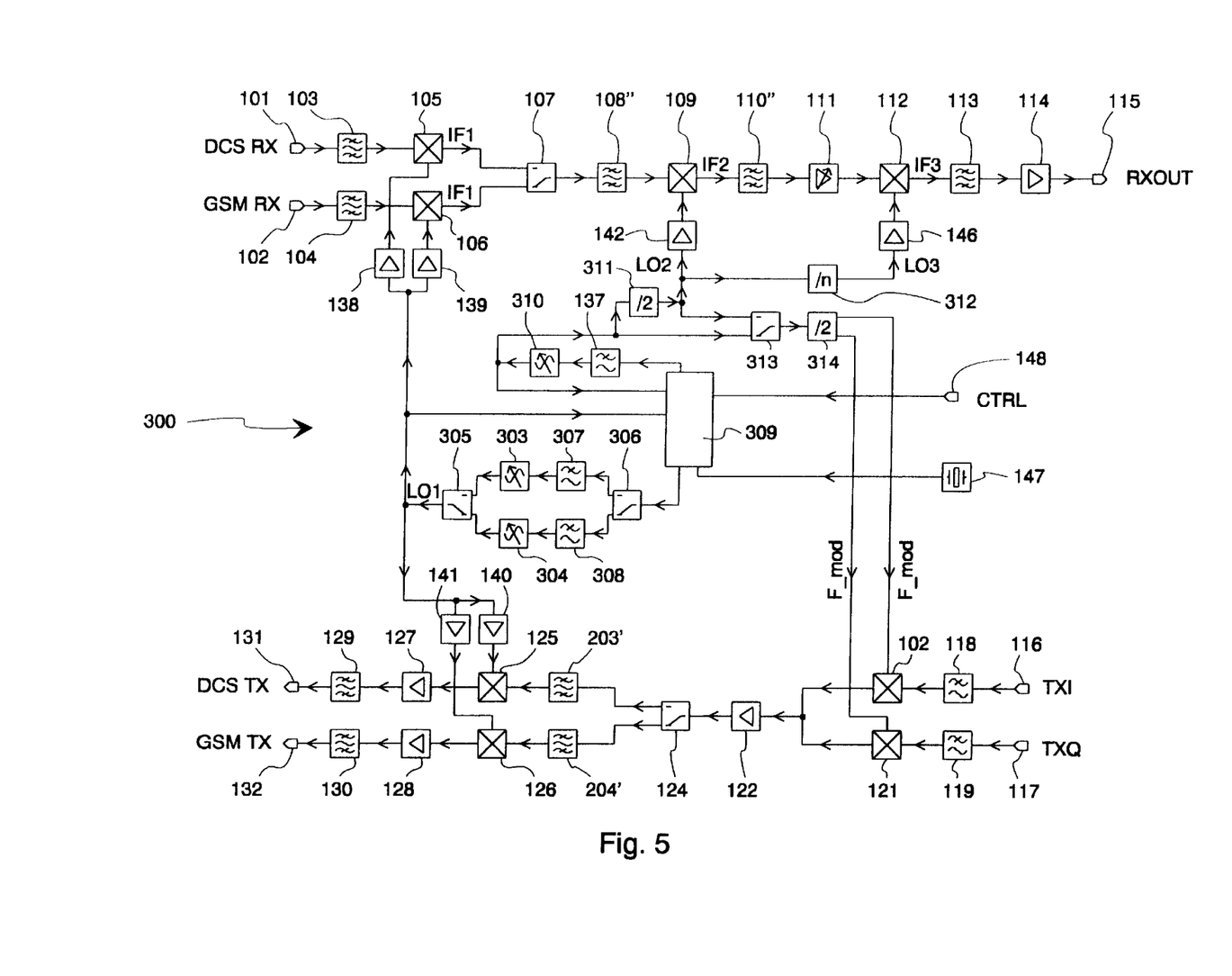
FIG. 5 shows a third radio transceiver according to the present invention.

The third condition means that it must be possible to generate the mixing frequency to be fed to the IQ modulator by simple multiplying or division operations, and the fourth condition implies that the UHF-VCO does not contain a frequency hop between GSM transmission and reception. There are many solutions for the equation group formed by conditions (3), but the most feasible one is LO3=58 MHz, F_mod=232 MHz, IF1=187 MHz, however so that in DCS, F_mod=116 MHz. FIG. 5 shows a radio apparatus 300 which is based on such a frequency solution.

In FIG. 5, the reception chain beginning from connections 101 and 102 and ending to connection 115 is similar to the one in FIG. 3, with the exception of the frequency response of the bandpass filters 108" and 110". The transmission chain beginning from connections 116 and 117 and ending to connections 131 and 132 is similar to that in FIG. 4, with the exception of the frequency response of the bandpass filters 203' and 204'. For the production of the first mixing frequency LO1, the apparatus has two UHF-VCOs 303 and 304, both of which are in turn selected for use by selection switches 305 and 306. Control signals come from the control logic 309 via low pass filters 307 and 308. Feeding the mixing frequency LO1 to certain mixers in the transmission and reception chains is carried out in the same way as is described above.

The VHF-VCO 310 generates a frequency of 464 MHz which is led to mixer 109 via divider 311 and amplifier 142. The signal of 232 MHz generated in divider 311 is further led to mixer 112 via divider 312 and amplifier 146, and to the second input of selection switch 313. The selection switch 313 is used for selecting a signal of 464 MHz or 232 MHz for divider 314 which generates the interdephased signal versions for the mixers 120 and 121 of the IQ modulator.

The most considerable drawback of the structure in FIG. 5 is that it requires two UHF-VCOs 303 and 304, thus increasing the manufacturing costs and power consumption. In addition, some undesired frequencies like said f spur and the mixing results formed of these are so close to the desired frequencies that very strict quality requirements have to be set for the mixers and filters in the reception chain.

Figure 6A:
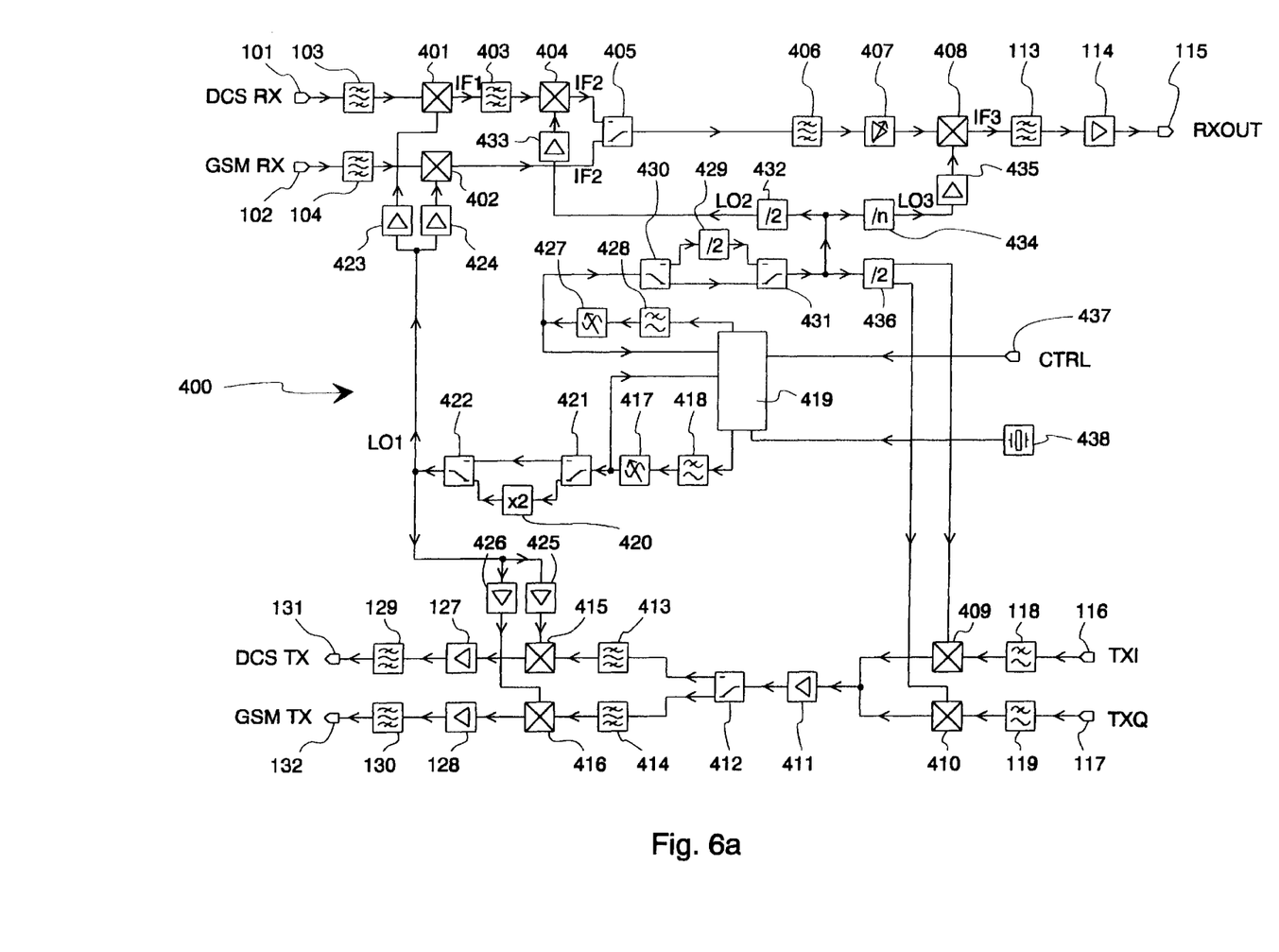
FIG. 6a shows a fourth radio transceiver according to the present invention.

In FIG. 6a, there is shown a radio transceiver 400 according to the invention which is intended to be used both in the GSM and DCS systems. Naturally, the invention is not limited to the equipment used in these radio systems, but it may be generalized for use in a transceiver of any radio system or systems with two frequency bands, on the conditions described later. A signal of the DCS system is led to an apparatus in accordance with FIG. 6a via connection 101, and a signal of the GSM system via connection 102 in the same way as in prior art devices. Also the radio frequency filters 103 and 104 may be similar to those described above. In mixer 401, a received signal of the DCS system is mixed onto the first DCS intermediate frequency by using a mixing frequency, the formation of which will be described later. Similarly, a received signal of the GSM system is mixed onto the first GSM intermediate frequency in mixer 402 by using the same mixing frequency. The radio system standards do not determine which intermediate frequencies have to be used; here, the terms DCS intermediate frequency and GSM internediate frequency are used for clarity, because the intermediate frequencies generated in the mixers 401 and 402 are unequal.

The signal received from mixer 401 is filtered in a bandpass type filter 403 and then mixed onto a second DCS intermediate frequency in mixer 404 by using a mixing frequency, the formation of which will be described later. The second DCS intermediate frequency is substantially equal to the first GSM intermediate frequency, for which reason both are marked with IF2 in the figure. The selection switch 405 is used for selecting which system's signal is led further from filter 406 and from there through automatic gain control 407 to mixer 408, in which the mixing onto a third intermediate frequency is carried out, most advantageously onto a frequency of 13 MHz. For the GSM signal, this is only the second intermediate frequency, but in order to avoid confusions, the result given by mixer 408 is called the third intermediate frequency regardless of whether the signal has originally been received in accordance with the DCS or GSM system. It is led to connection 115 via filter 113 and amplifier 114, and further to demodulator which may be known as such and which is not described in the figure.

In the transmitter chain, the I and Q signals coming via connections 116 and 117 are led through filters 118 and 119 to mixers 409 and 410; the formation of the mixing frequency coming to the mixers is discussed later. The mixing results are combined and led to amplifier 411 and further either to DCS filter 413 or GSM filter 414, depending on the position of the selection switch 412. The filtered signal is mixed onto the transmission frequency in mixer 415 (DCS) or 416 (GSM) and led via buffer amplifier 127 and filter 129 (DCS) or buffer amplifier 128 and filter 130 (GSM) to connection 131 (DCS) or 132 (GSM), from which it may further be led to a power amplifier (not shown) and via a possible antenna switch and/or duplex filter (not shown) to antenna (not shown).

The UHF-VCO 417 receiving its control signal from control logic 419 via low pass filter 418 is used for generating the mixing frequencies used in mixers 401, 402, 415 and 416; the input of the UHF-VCO contains a feedback coupling to the control logic in the same way as in prior art solutions. The frequency of the signal generated by the UHF-VCO 417 may, when necessary, be changed by using a frequency multiplier 420 by connecting it in series with the UHF-VCO 417 with the help of switches 421 and 422. When the switches 421 and 422 are in the first position, the mixing frequency generated by the UHF-VCO 417 is led directly to amplifiers 423, 424, 425 and 426 and further to respective mixers 401, 402, 415 and 416; in the second position of the switches 421 and 422, the mixing frequency generated by the UHF-VCO 417 is directed to the said amplifiers through frequency multiplier 420. The frequency multiplier 420 shown in the figure is a doubler. In addition to the fact that the frequency of the signal generated by the UHF-VCO 417 may be changed with the frequency multiplier 420, the UHF-VCO 420 naturally also has a tuning range, within the limits of which the frequency generated by it may be adjusted by control signals given by control logic 419.

The VHF-VCO 427 receiving its control signal from control logic 419 via low pass filter 428 is used for generating the mixing frequencies used in mixers 404, 408, 409 and 410; its output also contains a feedback coupling to the control logic in the same way as in prior art solutions and in the same way as from the UHF-VCO. A block changing the frequency with a simple operation may also be connected for use in series with the VHF-VCO 427. In FIG. 6a, the block in question is a frequency divider 429 which may be connected into use with the help of switches 430 and 431. Depending on the position of the switches 430 and 431, the frequency generated by the VHF-VCO is led either as such or via frequency divider 429 to frequency dividers 432, 434 and 436. The first one of these (432) generates a mixing frequency which is led to mixer 404 via amplifier 433, the second one (434) generates a mixing frequency which is led to mixer 408 via amplifier 435, and the third one (436) generates two interdephased frequencies, i.e. so-called I and Q mixing frequencies which are led to the mixers 409 and 410 of the IQ modulator in the transmission chain.

The operation of the radio transceiver 400 in FIG. 6a is visualized by the following observation. The second condition presented above in the equation group (3) was based on the fact that, in a radio transceiver shown in FIG. 3, the sum of or difference between the first intermediate frequency IF1 and the second intermediate frequency IF2 is equal to four times the mixing frequency LO3. For the sake of experiment, the second condition in question may be changed to the following form $$IF1 - 2 \times LO3 = \pm IF2 \quad (4)$$

In the research leading to the invention, several solutions were discovered for the equation group (3) in which the second condition has been replaced by condition (4). Of these solutions, at least LO3=58 MHz, F_mod=232 MHz, IF1=187 MHz, i.e. the same solution as above, is feasible. However, it may be stated that if the first intermediate frequency IF1 is ignored for GSM and the modulation frequency F_mod is divided by two, the frequency plan is substantially the same as in single-band GSM, i.e. in a conventional terminal of a radio system with one frequency band. In this case, a tried and found tuning range of the UHF-VCO is 1006–1031 MHz. Correspondingly, the tuning range of the UHF-VCO required by the operation according to DCS is—taking into consideration the solution of the equation group presented above—1942–2067 MHz. If these latter limits of the UHF-VCO tuning range are divided by two, a frequency band of 971–1033.5 MHz is obtained, which includes the whole UHF-VCO tuning range 1006–1031 MHz mentioned above in connection with GSM. In a radio transceiver with two frequency bands, it is thus possible to use one UHF-VCO the tuning range of which is either 971–1033.5 MHz or 1942–2067 MHz. In the first case, the mixing frequencies required by GSM and generated by the UHF-VCO are taken directly from the UHF-VCO, and the mixing frequencies required by DCS and generated by UHF-VCO are generated with the help of a frequency multiplier (doubler). In the latter case, the mixing frequencies required by DCS and generated by UHF-VCO are taken directly from UHF-VCO, and the mixing frequencies required by GSM and generated by UHF-VCO are generated with the help of a frequency divider (halving device).

The operation of the radio transceiver of FIG. 6a is next described. If the apparatus is to be used for transmission and reception in accordance with the GSM system, switches 405 and 412 are switched to their lower positions so that the signal generated by mixer 402 in the reception chain is directed to filter 406, and in the transmission chain, the signal generated by amplifier 411 is directed to filter 414. Switches 421 and 422 are switched to their upper positions so that the mixing frequency of 464 MHz generated by the UHF-VCO 417 is led directly to amplifiers 424 and 426 without passing through doubler 420. Similarly, switches 430 and 431 are switched to their upper positions so that the mixing frequency of 464 MHz generated by the VHF-VCO is directed to frequency divider 429, in which its frequency is divided by two. The signal of 232 MHz thus generated is further led to frequency divider 436 dividing by two. Thus, the mixing frequency of the mixer 408 is 58 MHz and the mixing frequency of the mixers 409 and 410 is 116 MHz (the signals of 116 MHz led to mixers 409 and 410 have a mutual phase difference of 90 degrees). References to the upper and lower positions of the switches naturally refer only to the graphic symbols of the block diagram in the figure, and they do in no way limit the realization of respective switches in a radio apparatus in practice.

Because the radio transceiver of FIG. 6a cannot operate simultaneously in accordance with both the GSM and DCS system, in order to save electric energy, it is advantageous to cut off all operating and control voltages in the blocks that are not needed. In other words, during GSM operation, all blocks used in DCS operation are powered down, and vice versa.

In the GSM system, the carrier frequencies received by the terminal are located at 200 kHz intervals from 935 MHz to 960 MHz, and the carrier frequencies transmitted by the terminal are located at 200 kHz intervals from 890 MHz to 915 MHz. The duplex interval is 45 MHz, i.e. a terminal receiving a carrier frequency of N MHz, transmits on carrier frequency of N-45 MHz. Tuning the terminal onto certain carrier frequencies is carried out in a known way by adjusting the mixing frequency generated by the UHF-VCO and used in the first downmixing of the receiver chain and in the last upmixing of the transmission chain in a suitable way.

If the radio transceiver in FIG. 6a operates as a GSM terminal receiving, for example, on the frequency of 947.4 MHz, the UHF-VCO is adjusted to generate a mixing frequency of 1018.4 MHz. Mixer 402 generates an intermediate frequency of 1018.4 MHz–947.4 MHz=71 MHz, which is further mixed down onto the frequency of 71 MHz–58 MHz=13 MHz in mixer 408. In the transmission chain, the frequency of a modulated signal generated by the IQ modulator is 116 MHz, and it is mixed up in mixer 416 onto the frequency of 1018.4 MHz–116 MHz=902.4 MHz, which is the desired carrier frequency for the transmission (947.4 MHz–45 MHz=902.4 MHz). With a similar calculation process it is easy to ensure that the arrangement in FIG. 6a works in all GSM frequencies.

If the radio transceiver in FIG. 6a is to be used for transmission and reception in accordance with the DCS system, switches 405 and 412 are switched to their upper positions so that, in the reception chain, the signal generated by mixer 404 is led to filter 406 and, in the transmission chain, the signal output by amplifier 411 is led to filter 413. Switches 421 and 422 are switched to their lower positions so that the mixing frequency generated by the UHF-VCO 417 is led to amplifiers 423 and 425 via doubler 420. The position of the switches 430 and 431 changes between transmission and reception when operating according to DCS. During DCS reception (RX), switches 430 and 431 are switched to upper positions so that the mixing frequency of 464 MHz generated by the VHF-VCO is led via frequency divider 429 to frequency divider 432 dividing by two and to frequency divider 434 dividing by four. In mixer 404, the mixing frequency is then 116 MHz, and in mixer 408, the mixing frequency is 58 MHz. During DCS transmission (DCS TX), switches 430 and 431 are switched to lower positions so that the mixing frequency of 464 MHz is led to frequency divider 436 dividing by two without passing through the divider 429.

In the DCS system, the carrier frequencies received by the terminal are located between 1805 and 1880 MHz, and the carrier frequencies transmitted by the terminal are between 1710 and 1785 MHz. The duplex interval is 95 MHz. If the radio transceiver of FIG. 6a operates as a DCS terminal receiving, for example, on the frequency of 1830 MHz, the UHF-VCO is adjusted to generate a mixing frequency of 1008.5 MHz which is redoubled to a frequency of 2017 MHz with a frequency multiplier 420. Mixer 401 generates a first intermediate frequency of 2017 MHz–1830 MHz=187 MHz which is mixed down onto a second intermediate frequency of 187 MHz–116 MHz=71 MHz in mixer 404 and further onto a frequency of 71 MHz–58 MHz=13 MHz in mixer 408. In the transmission chain, the frequency of a modulated signal generated by the IQ modulator is 232 MHz because, for the time of the transmission, the divider 429 has been by-passed by using the switches 430 and 431; the IQ frequencies which are in mutual phase displacement of 90 degrees are generated in the divider 436 from the VHF-VCO frequency of 464 MHz led to it. For the time of the DCS transmission, the UHF-VCO frequency has been altered downwards with the amount of the frequency hop (25 MHz) so that the mixing frequency 2×(1008.5 MHz–25 MHz)= 1967 MHz is obtained for the mixer 415 via doubler 420 and amplifier 425. The signal is mixed up in mixer 415 onto the frequency of 1967 MHz–232 MHz=1735 MHz, which is the desired carrier frequency (1830 MHz–95 MHz=1735 MHz) for the transmission. With the similar calculation process, it is easy to make sure that the arrangement of FIG. 6a works on all DCS frequencies.

In FIG. 6a, control logic 419 controls the operation of the UHF-VCO 417 and VHF-VCO 427 in a known way (cf. control logic 135, 206 and 309 in FIGS. 3–5). For the part of the VHF-VCO 427, control logic 419 controls that its frequency remains within certain tolerances in 464 MHz. As a response to commands via control connection 437, control logic 419 adjusts the frequency of the UHF-VCO to a value suitable for each moment. Commands through control connection 419 are most advantageously given by a certain microprocessor (not shown in figures) controlling the operation of the radio transceiver, and they are based on the allocations of carrier frequencies transmitted to the base station terminal by the radio system, and on the timing applied to the radio system. The frequency given by crystal oscillator 438 acts as the fixed reference frequency for the control logic 419 in a way known in itself.

The technical realization of all the blocks shown in FIG. 6a is known; similar blocks are seen in FIGS. 1 and 2 in connection with the description of prior art. For one skilled in the art it is in itself known how the filters, amplifiers, mixers and other parts in FIG. 6a are manufactured so that they work optimally just on the frequencies shown in FIG. 6a. Of the arrangement in FIG. 6a, the largest part may, when so required, be manufactured as one integrated circuit so that it takes as little space as possible in the finished radio apparatus and that its production may be automated in an effective way.

Figure 6B:
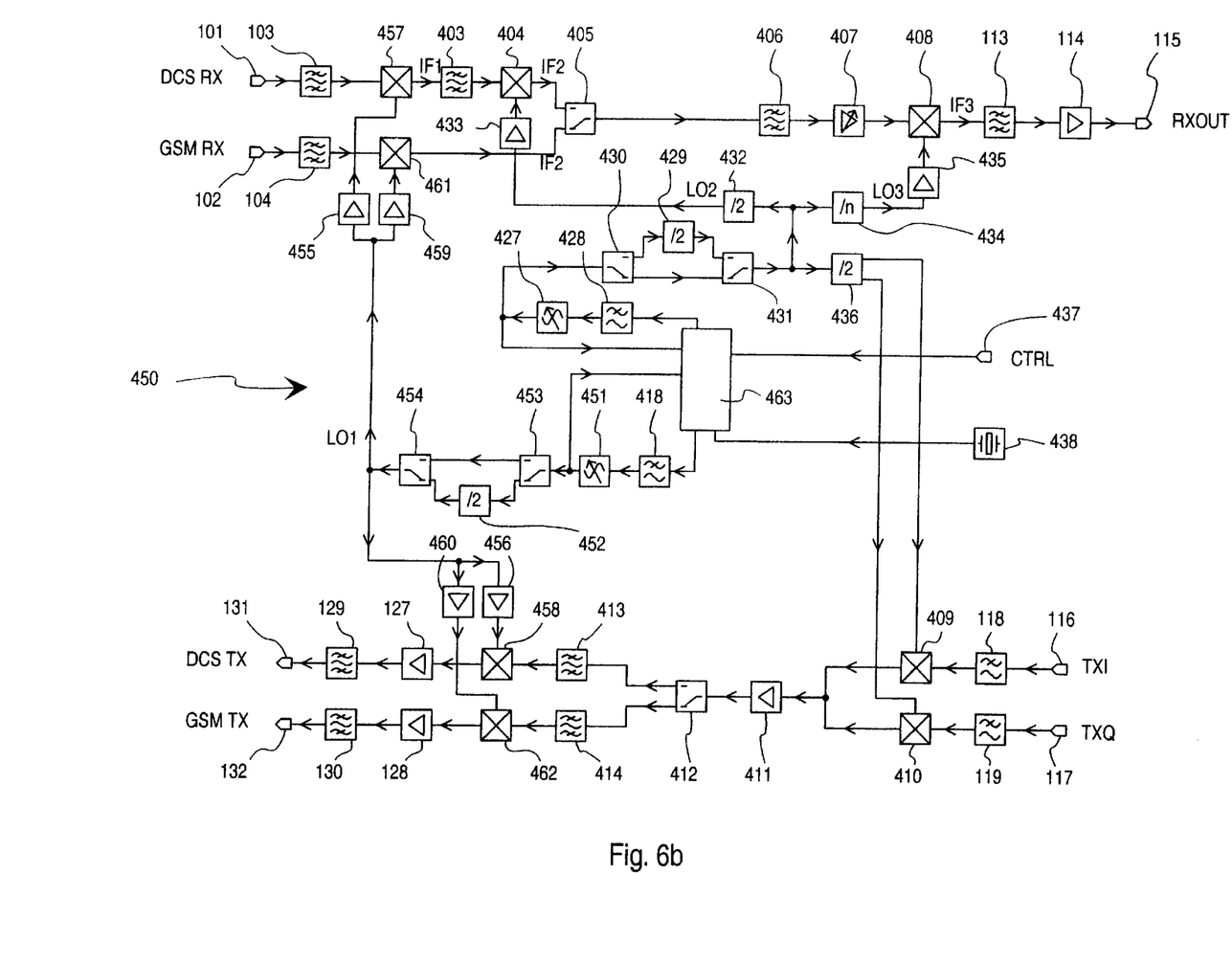
FIG. 6b shows a fifth radio transceiver according to the present invention.

FIG. 6b shows a modification 450 of the radio transceiver of FIG. 6a. Here the tuning range of the UHF-VCO 451 is 1942–2067 MHz, and the redoubling frequency multiplier 420 and switches 421 and 422 in FIG. 6a have been replaced by a frequency divider 452 and switches 453 and 454. For generating and receiving the radio transmissions according to the DCS system, the frequency given by the UHF-VCO 451 is led as such to mixers 457 and 458 via amplifiers 455 and 456. In the operation in accordance with the GSM system, the frequency given by the UHF-VCO 451 is led to frequency divider 452, which carries out the division by two. The resulting frequency is led to mixers 461 and 462 via amplifiers 459 and 460. The blocks 451–462 and control logic 463 are principally similar to those described above, but they have been adapted to work optimally on frequencies used in the embodiment of FIG. 6b. The other blocks may be similar to those in FIG. 6a. Because in the embodiment of FIG. 6b, the frequency of the UHF-VCO 451 is used as mixing frequency in the DCS operation without the redoubling in accordance with the embodiment of FIG. 6a, the frequency hop between the DCS reception and DCS transmission is twofold compared with FIG. 6a, i.e. 50 MHz.

Figure 7:
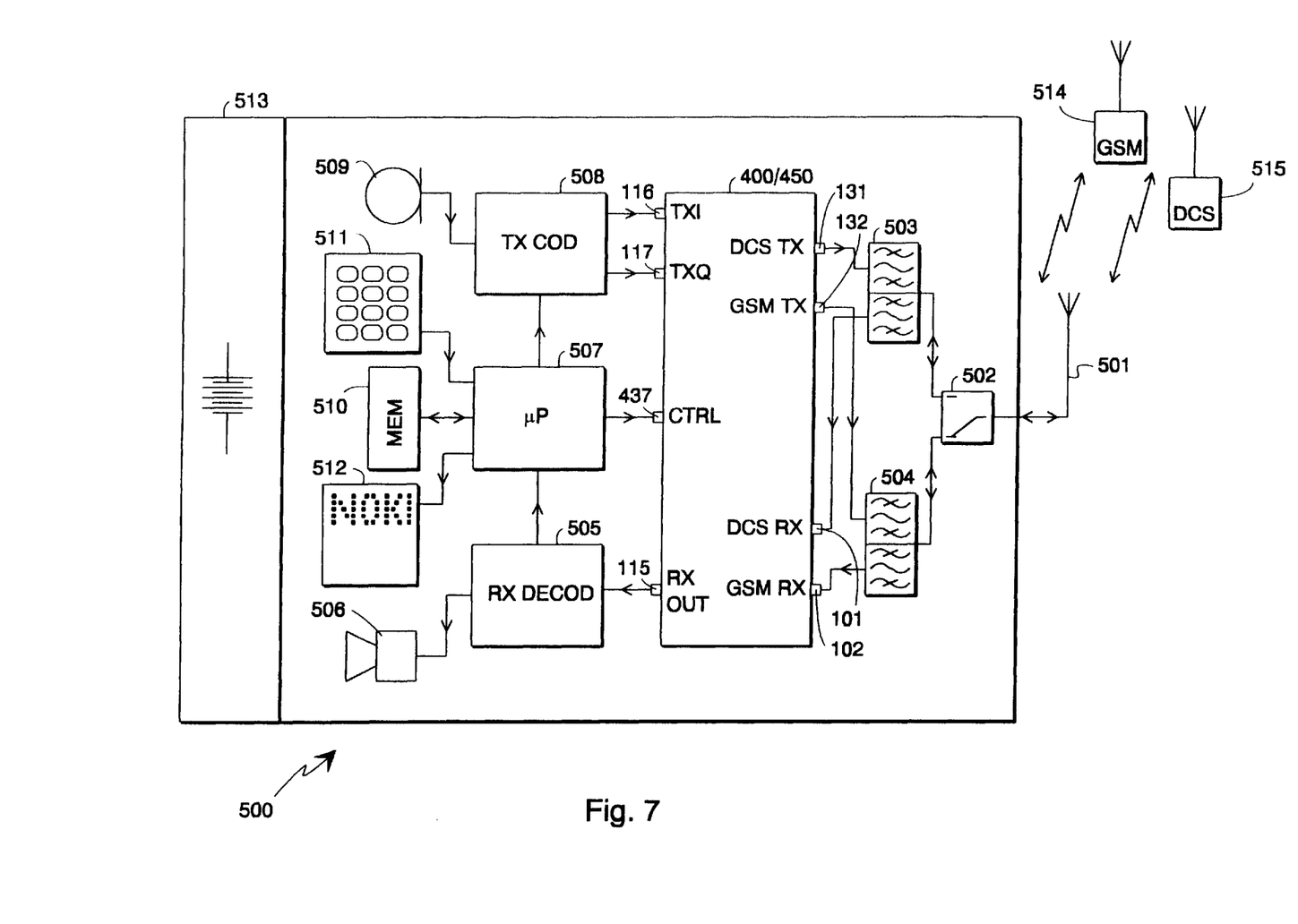
FIG. 7 describes the way the invention is applied to a mobile phone.

In FIG. 7, there is shown an exemplary location of the apparatus 400/450 of FIGS. 6a or 6b in a mobile phone. The mobile phone 500 in the figure comprises antenna 501 and switch 502 connected to the antenna, the switch being used to select either the GSM or DCS operation. The position of the switch 502 is most advantageously selected by a microprocessor controlling the operation of the mobile phone. The mobile phone 500 comprises two duplex filters 503 and 504, in which the signal on the reception frequency received by the antenna 501 is led to the input connections 101 and 102 of the receiver chain in the apparatus 400/450, and the signal coming from the output connections 131 and 132 of the transmitter chain in the apparatus 400/450 is led to the antenna 501. Transmitter power amplifiers are omitted from FIG. 7, but they are most advantageously situated between the output connections 131 and 132 and the filters 503 and 504. The block 505 connected to the output connection 115 of the receiver chain comprises conventional demodulation and decoding operations, with which the signal mixed onto the frequency of 13 MHz and given by the apparatus 400/450 is converted to an analog audio signal which is led to loudspeaker 506, and to data signals which are led to the control block 507. Block 508 connected to input connections 116 and 117 in the transmission chain comprises conventional coding and other operations, with which the analog audio signal generated by the microphone 509 and the data signals fed by the control block 507 are converted into digital I and Q bit strings. In addition, the mobile phone 500 comprises memory parts 510, keyboard 511, display 512, and power source 513.

The mobile phone 500 may be used as a terminal for two different cellular radio systems which means that it may be in radio connection either with a base station 514 of the GSM system or with a base station 515 of the DCS system. The control block 507, which usually is a microprocessor, arranges the electrically controllable switches included in the mobile phone 500 into a position which corresponds to the selected radio cellular system, and also otherwise controls the operation of the mobile phone as controlled by the program stored in the memory 510, by keyboard commands given by the user, and by system commands transmitted via the base stations. The base stations 514 and 515 may send the mobile station information about the frequency bands in use at a given time and about the load situation of the different systems. Through base stations 514, 515, the GSM system or DCS system may, for example, send a double-acting mobile phone 500 a command to change the frequency band (and the system), if the services of the other system are not available in the geographic region in question, or if the other system is able to offer a larger data transmission capacity or otherwise better service level.

In order to enable a base station of the cellular radio system to transmit the terminal a command to change the frequency band, the cellular radio system has to contain information about what other frequency bands are available in the same geographical region. The known base stations of the cellular radio systems are able to transmit the known terminals information, for example, about the BCCH frequency (Broadcast Control Channel) in use in the neighbouring cells, so that invention only requires the cellular radio system to be additionally equipped with storing equipment for storing the information about the other frequency bands. In addition, a certain message has to be determined on a protocol level in the system, which the base station may send and which the double-acting terminals can interpret as a command to change the frequency band.

It is obvious for one skilled in the art that the described embodiments of the invention are exemplary, and that they are in no way intended to limit the invention or the scope defined by the enclosed claims. Although the operation of a mobile phone of the invention has above been described only in connection with the GSM and DCS systems, the invention is also applicable to other kinds of radio transceivers with two radio systems. The prerequisite is that the frequencies used by the different radio systems differ from each other sufficiently so that the first down-mixing frequency of the receiver and the last up-mixing frequency of the transmitter may, in operation according to another system, be generated with a simple operation from those frequencies which are used as the first down-mixing frequency of the receiver and the last up-mixing frequency of the transmitter in the operation in accordance with the first system. The invention does not require the two frequency bands in the description expressly be frequency bands of two different data transmission systems, but the invention is also adapted for use in such a single system (for example, UMTS system; Universal Mobile Telecommunications System) in which there are several frequency bands for reception and transmission. The invention is also suited for such a system in which reception and transmission are carried out in accordance with TDD (Time Division Duplex) in the same frequency band without a duplex interval.

Further, the invention is not limited to the embodiments shown in the figures, as far as the mutual arrangement of the components is concerned. For example, an embodiment may be presented, in which the mixers used in the higher frequency band for generating the second intermediate frequency from the received signal, change places in relation to the embodiments in FIGS. 6*a* and 6*b*. In this case, the received signal of the higher frequency band would be mixed down first by using the mixing frequency LO2 and then by using the mixing frequency LO1 so that after appropriate filtering operations, the same second intermediate frequency IF2 would be obtained as above.

What is claimed is:

1. A radio transceiver for the transmission and reception of signals in two frequency bands; the radio transceiver comprising
   a first signal input for receiving radio signals in the first frequency band,
   a second signal input for receiving radio signals in the second frequency band,
   a first mixer connected to the first signal input for mixing the radio signals of the first frequency band onto a predetermined first intermediate frequency,
   a second mixer for mixing said first intermediate frequency onto a predetermined second intermediate frequency, and
   a third mixer connected to the second signal input for mixing the radio signals of the second frequency band onto a predetermined frequency which is substantially the same as said second intermediate frequency.

2. The radio transceiver of claim 1, further comprising an intermediate frequency amplifier and a switch component having two states, of which in the first state said switch component is arranged to lead the signal generated by said second mixer to said intermediate frequency amplifier, and in the second state said switch component is arranged to lead the signal generated by said third mixer to said intermediate frequency amplifier.

3. The radio transceiver of claim 1, further comprising
   a first frequency synthesizer for generating a first mixing frequency for said first mixer, and
   a frequency divider for generating a second mixing frequency for said third mixer by dividing the frequency generated by said first frequency synthesizer by an integer.

4. The radio transceiver of claim 1, further comprising
   a first frequency synthesizer for generating a second mixing frequency for said third mixer, and
   a frequency multiplier for generating a first mixing frequency for said first mixer by multiplying the frequency generated by said first frequency synthesizer by an integer.

5. The radio transceiver of claim 1, further comprising a modulator for modulating a certain oscillation on a modulation frequency by the signal to be transmitted, whereby for generating said oscillation on modulation frequency, it comprises a second frequency synthesizer and a frequency divider and a group of switch components with two states so that in the first state of said switch components they are arranged to connect the signal generated by said second frequency synthesizer via said frequency divider to the modulator, and in the second state of said switch components they are arranged to connect the signal generated by said second frequency synthesizer past said frequency divider to the modulator.

6. The radio transceiver of claim 5, further comprising means for leading the signal generated by said second frequency synthesizer to said second mixer.

7. The radio transceiver of claim 1, further comprising at least a fourth mixer for generating a radio signal with transmission frequency and means for leading the signal generated by said first frequency synthesizer as the mixing frequency to the fourth mixer.

8. The radio transceiver of claim 7, comprising a fourth mixer for generating a radio signal with transmission frequency in the first transmission frequency band and a fifth mixer for generating a radio signal with transmission frequency in the second transmission frequency band, and means for leading the signal generated by said first frequency synthesizer as the mixing frequency to said fourth mixer and said fifth mixer.

9. A method for handling signals in a radio apparatus arranged to optionally operate in two frequency bands so that, in at least one frequency band, transmission and reception are carried out by using time division multiplexing, and to use a predetermined set of common intermediate frequency components for reception in both frequency bands; wherein according to said method when operating in the first frequency band, the received signal with radio frequency is first mixed onto a first intermediate frequency and then onto a second intermediate frequency before leading it to the intermediate frequency components common for the operation in both frequency bands; and when operating in the second frequency band, the received signal with radio frequency is mixed in one mixer onto an intermediate frequency, which is substantially equal to said second intermediate frequency, before leading the signal to the intermediate frequency components common for the operation in both frequency bands.

10. A method according to claim 9, wherein said first intermediate frequency is at least two times as big as said second intermediate frequency.

11. A method according to claim 9, wherein additionally a modulation frequency is generated for generating a modulated signal to be transmitted, said modulation frequency being bigger when operating in the first frequency band than in the second frequency band.

12. A method according to claim 11, wherein, when operating in the first frequency band, said modulation frequency is two-fold compared with the modulation frequency when operating in the second frequency band.

13. A method according to claim 11, wherein said modulation frequency is derived from the signal generated by a such frequency synthesizer which is also used for generating the mixing frequency for a received signal in a certain intermediate frequency mixing.

14. A method according to claim 11, wherein, in operation according to each of the frequency bands, said modulation frequency is bigger than the first intermediate frequency onto which the received signal with radio frequency is mixed.

15. A method according to claim 14, wherein, when transmission and reception are separated by time division duplex and when the difference between the transmission and reception frequencies is as big as a certain duplex interval, said modulation frequency is equal to the sum of said first intermediate frequency and said duplex interval.

16. A method according to claim 9, wherein a signal with transmission frequency is further generated by using the same mixing frequency which is used for mixing the received signal onto the first intermediate frequency.

17. A method according to claim 16, wherein the mixing frequency used for generating the signal with transmission frequency and for mixing the received signal onto the first intermediate frequency is bigger than the frequencies in the transmission frequency band and the frequencies in the reception frequency band.

18. A method according to claim 9, wherein, when operating in the first frequency band, the mixing frequency, by which the signal with reception frequency is mixed onto the first intermediate frequency, is tuneable between a certain first lower limit and a certain first upper limit; and when operating in the second frequency band, the mixing frequency, by which the signal with reception frequency is mixed onto the first intermediate frequency, is tuneable between a certain second lower limit and a certain second upper limit; wherein said first lower limit is smaller than two times said second lower limit, and said first upper limit is bigger than two times said second upper limit.

19. A method according to claim 9, wherein one of the frequency bands of the received signal is the same as one of the frequency bands of a signal with transmission frequency generated in the same radio apparatus.

20. A terminal of a cellular radio system for transmission and reception of radio signals with two frequency bands and for using time division multiplexing for transmission and reception in at least one frequency band, the terminal of the cellular radio system comprising a radio transceiver including a first signal input for receiving a radio signal in the first frequency band, and a second signal input for receiving a radio signal in the second frequency band; and in said radio transceiver a first mixer connected to the first signal input for mixing the radio signals of the first frequency band onto a predetermined first intermediate frequency, a second mixer for mixing said first intermediate frequency onto a predetermined second intermediate frequency, and a third mixer connected to the second signal input for mixing the radio signals of the second frequency band onto a predetermined frequency which is substantially the same as said second intermediate frequency.

21. Terminal of a cellular radio system according to claim 20, further comprising a control block for controlling the operation of the apparatus, said control block being equipped to interpret a certain piece of information of the cellular radio system as a command to change the frequency band, and as a response for the interpretation, to guide the radio transceiver to change the frequency band.

* * * * *